United States Patent
Brokenshire et al.

(10) Patent No.: US 7,986,330 B2
(45) Date of Patent: Jul. 26, 2011

(54) METHOD AND APPARATUS FOR GENERATING GAMMACORRECTED ANTIALIASED LINES

(75) Inventors: Daniel Alan Brokenshire, Round Rock, TX (US); Bruce David D'Amora, New Milford, CT (US); Gordon Clyde Fossum, Austin, TX (US); Charles Ray Johns, Austin, TX (US); John Samuel Liberty, Austin, TX (US); Brad William Michael, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 2907 days.

(21) Appl. No.: 09/833,348

(22) Filed: Apr. 12, 2001

(65) Prior Publication Data

US 2002/0158885 A1    Oct. 31, 2002

(51) Int. Cl.
*G09G 5/00*    (2006.01)

(52) U.S. Cl. ....................................................... 345/611
(58) Field of Classification Search .................. 345/611, 345/156; 382/167
See application file for complete search history.

(56) References Cited

U.S. PATENT DOCUMENTS

| | | | | |
|---|---|---|---|---|
| 5,012,163 A | * | 4/1991 | Alcorn et al. | 315/383 |
| 6,304,300 B1 | * | 10/2001 | Warren et al. | 348/674 |
| 6,326,964 B1 | * | 12/2001 | Snyder et al. | 345/419 |
| 2001/0055025 A1 | * | 12/2001 | Deering et al. | 345/611 |

* cited by examiner

*Primary Examiner* — Javid A Amini
(74) *Attorney, Agent, or Firm* — Yee & Associates, P.C.; Matthew W. Baca (57) ABSTRACT

A method, apparatus, and computer implemented instructions for generating antialiased lines for display in a data processing system. Graphics data is received for display, wherein the graphics data includes primitives defining lines. A gamma correction is applied to the graphics data on a per primitive basis to form antialiased lines. The antialiased lines are displayed.

23 Claims, 7 Drawing Sheets

```
if (env=getenv("_OGL_GAMMA_FILTER")){
/* Gamma filtered*/                              1000
    float gamma;
    float sum;
    int factor;
    int width;
    int size;

gamma=1.0;
    gamma=atof(env);

width=8;
    if (env=getenv("_OGL_GAMMA_TABLEWIDTH"))
        width=atoi(env);
    factor=(int)pow(2.0, (double) (8.0-width));

sum=256.0;
    if (env=getenv("_OGL_GAMMA_SUM"))
        sum=atof(env);

size=256;
    if (env=getenv("_OGL_GAMMA_TABLESIZE")){
        size=atoi(env);
     switch (size) {
     case 16:
      for (i=0; i<256; i+=16) {
        a=sum * pow((double)(i/256.0), (double)(1.0/gamma));
        b=sum * pow((double)((i+1)/256.0), (double)(1.0/gamma));
        c=sum * pow((double)((i+2)/256.0), (double)(1.0/gamma));
        d=sum * pow((double)((i+3)/256.0), (double)(1.0/gamma));
        e=sum * pow((double)((i+4)/256.0), (double)(1.0/gamma));
        f=sum * pow((double)((i+5)/256.0), (double)(1.0/gamma));
        g=sum * pow((double)((i+6)/256.0), (double)(1.0/gamma));
        h=sum * pow((double)((i+7)/256.0), (double)(1.0/gamma));
        i=sum * pow((double)((i+8)/256.0), (double)(1.0/gamma));
        j=sum * pow((double)((i+9)/256.0), (double)(1.0/gamma));
        k=sum * pow((double)((i+10)/256.0), (double)(1.0/gamma));
        l=sum * pow((double)((i+11)/256.0), (double)(1.0/gamma));
        m=sum * pow((double)((i+12)/256.0), (double)(1.0/gamma));
        n=sum * pow((double)((i+13)/256.0), (double)(1.0/gamma));
        o=sum * pow((double)((i+14)/256.0), (double)(1.0/gamma));
        p=sum * pow((double)((i+15)/256.0), (double)(1.0/gamma));
        AAFilterTable[i]=AAFilterTable[i+1]=
        AAFilterTable[i+2]=AAFilterTable[i+3]=
        AAFilterTable[i+4]=AAFilterTable[i+5]=
        AAFilterTable[i+6]=AAFilterTable[i+7]=
```

```
        AAFilterTable[i+8]=AAFilterTable[i+9]=
        AAFilterTable[i+10]=AAFilterTable[i+11]=
        AAFilterTable[i+12]=AAFilterTable[i+13]=
        AAFilterTable[i+14]=AAFilterTable[i+15]=
            (int)((((a+b+c+d+e+f+
            (int)((((a+b+c+d+e+f+
              g+h+ii+j+k+m+
              n+o+p)/(16.0*factor))+0.5)*factor);
    }
    break;
  case 32;
    for (i=0; i<256; i+=8) {
      a=sum * pow((double)(i/256.0), (double)(1.0/gamma));
      b=sum * pow((double)((i+1)/256.0), (double)(1.0/gamma));
      c=sum * pow((double)((i+2)/256.0), (double)(1.0/gamma));
      d=sum * pow((double)((i+3)/256.0), (double)(1.0/gamma));
      e=sum * pow((double)((i+4)/256.0), (double)(1.0/gamma));
      f=sum * pow((double)((i+5)/256.0), (double)(1.0/gamma));
      g=sum * pow((double)((i+6)/256.0), (double)(1.0/gamma));
      h=sum * pow((double)((i+7)/256.0), (double)(1.0/gamma));
     AAFilterTable[i]=AAFilterTable[i+1]=AAFilterTable[i+2]=
     AAFilterTable[i+3]=AAFilterTable[i+4]=AAFilterTable[i+5]=
     AAFilterTable[i+6]=AAFilterTable[i+7]=(int)((((a+b+c+d+e+f+g+h)/(8.0*factor))+0.5)*factor);
    }
    break;
  case 64;
    for (i=0; i<256; i+=4) {
      a=sum * pow((double)(i/256.0), (double)(1.0/gamma));
      b=sum * pow((double)((i+1)/256.0), (double)(1.0/gamma));
      c=sum * pow((double)((i+2)/256.0), (double)(1.0/gamma));
      d=sum * pow((double)((i+3)/256.0), (double)(1.0/gamma));
     AAFilterTable[i]=AAFilterTable[i+1]=
     AAFilterTable[i+2]=AAFilterTable[i+3]=
        (int)((((a+b+c+d)/4.0*factor))+0.5*factor);
    }
    break;
  case 128;
    for (i=0; i<256; i+=2) {
      a=sum * pow((double)(i/256.0), (double)(1.0/gamma));
      b=sum * pow((double)((i+1)/256.0), (double)(1.0/gamma));
     AAFilterTable[i]=AAFilterTable[i+1]=
        (int)((((a+b)/2.0*factor))+0.5*factor);
    }
    break;
  case 256;
    for (i=0; i<256; i++) {
     AAFilterTable[i]=
      (int)((((sum * pow((double)(i/256.0), (double)(1.0/gamma)))/factor)+0.5)*factor);
    }
    break;
  }
}
```

Assumptions: Floating point coverages are defined in the normalized 0.0 to 1.0 range in which 0.0 corresponds to no coverage and 1.0 corresponds to full coverage. Fixed point coverages are defined in the range 0 to size −1.

```
float * GenFloatingPtGammaTable(int   size,
                                float gamma)
{
  int i;
  float * table;

if (table=malloc(sizeof(float)*size)) {
    for (i=0; i<size; i++) {
      table[i]=(float)pow((double)i/(size-1), (double)(1.0/gamma));
    }
  }
  return (table);
} int * GenFixedPtGammaTable(int   size,
                           float gamma)
{
  int i;
  int *table;
  float val;

if (table=malloc(sizeof(int)*size)) {
    for(i=0; i<size; i++) {
      val=(float)pow((double)i/(size-1), (double)(1.0/gamma));
        table[i]=(int)((size-1)*val+0.5);
    }
  }
  return (table);
}
```

METHOD AND APPARATUS FOR GENERATING GAMMACORRECTED ANTIALIASED LINES

BACKGROUND OF THE INVENTION

1. Technical Field

The present invention relates generally to an improved data processing system and in particular to a method and apparatus for processing data. Still more particularly, the present invention provides a method and apparatus for processing graphics data.

2. Description of Related Art

Data processing systems, such as personal computers and work stations, are commonly utilized to run computer-aided design (CAD) applications, computer-aided manufacturing (CAM) applications, and computer-aided software engineering (CASE) tools. Engineers, scientists, technicians, and others employ these applications daily. These applications involve complex calculations, such as finite element analysis, to model stress in structures. Often, modeling of these complex structures requires computer generated surfaces and lines that describe the features of physical models. Other applications include chemical or molecular modeling applications. CAD/CAM/CASE applications are normally graphics intensive in terms of the information relayed to the user. Data processing system users may employ other graphics intensive applications, such as desktop publishing applications. Generally, users of these applications require and demand that the data processing systems be able to provide extremely fast graphics information.

The processing of a graphics data stream to provide a graphical display on a video display terminal requires an extremely fast graphics system to provide a display with a rapid response. In these types of graphics systems, primitives are received for processing and display. A primitive is a graphics element that is used as a building block for creating images, such as, for example, a point, a line, a polygon, or text. A primitive is defined by a group of one or more vertices. A vertex defines a point, an end point of an line, or a corner of a polygon where two lines intersect. Data also is associated with a vertex in which the data includes information, such as positional coordinates, colors, normals, and texture coordinates. Commands are sent to the graphics system to define how the primitives and other data should be processed for display.

When lines are displayed on a display screen, a "stair stepping" or "jagged" appearance may be seen depending on the resolution of the display. This visual artifact is a manifestation of a sampling error called aliasing. Graphics adapters typically support a gamma adjustment on a screen or window basis that lightens or darkens the contents of the entire screen or window. Antialiasing techniques are implemented for smoothing or correcting this artifact. These techniques typically specify gradations in intensity of neighboring pixels near the edges of primitives, rather than setting pixels to maximum or zero intensity. These techniques essentially blur the lines by strategically adding pixels with a lower color intensity along the mathematical center of the line. As a result, lines normally one pixel in width are rendered as two or more pixel width lines. These techniques tend to dampen or dilute the intended color intensity for the lines.

Therefore, it would be advantageous to have an improved method and apparatus for correcting artifacts or aliasing in text, points, lines, or triangles.

SUMMARY OF THE INVENTION

The present invention provides an improved method, apparatus, and computer implemented instructions for generating antialiased lines for display in a data processing system. This technique also may be applied to other primitives for other images, such as points, polygons, and text. Graphics data is received for display, wherein the graphics data includes primitives. A gamma correction is applied to the graphics data on a per primitive basis to form an antialiased line. In other words, only pixels generated for the line are adjusted. The gamma-corrected antialiased line is displayed.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 10A-10B are code illustrating a process for generating a gamma correction table in accordance with a preferred embodiment of the present invention.

DETAILED DESCRIPTION OF THE PREFERRED EMBODIMENT

Figure 1:
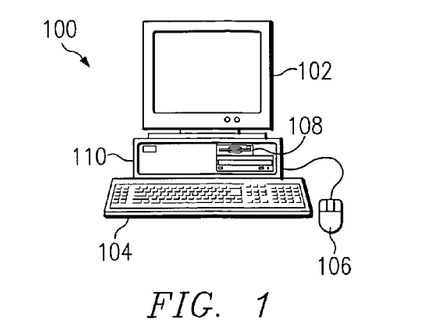
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 110, a video display terminal 102, a keyboard 104, storage devices 108, which may include floppy drives and other types of permanent and removable storage media, and mouse 106. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

Figure 2:
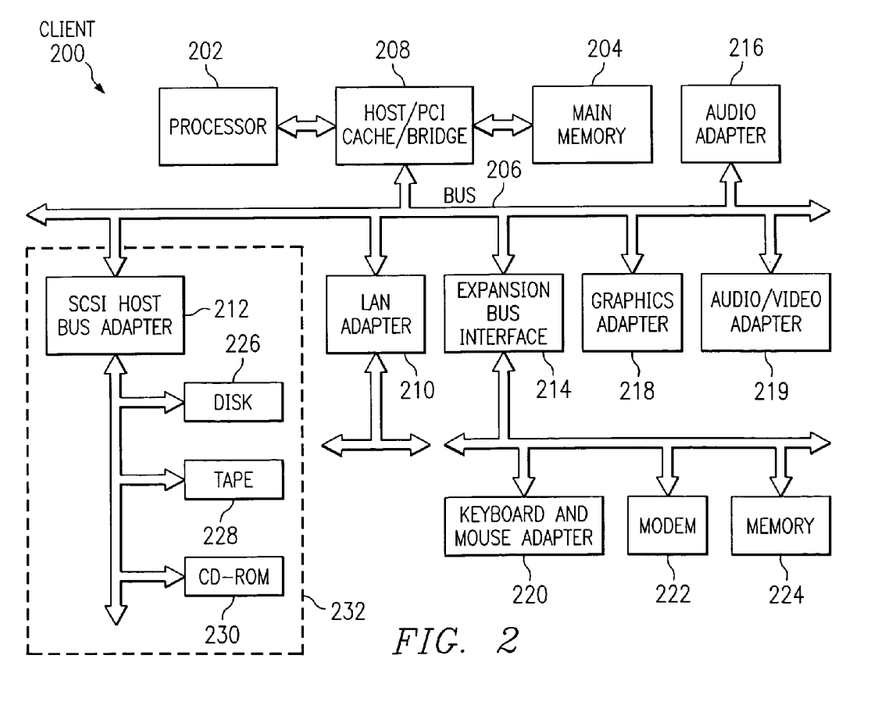
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI bus 206 through PCI bridge 208. PCI bridge 208 also may include an integrated memory controller and cache memory for processor 202. Additional connections to PCI bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide nonvolatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

The present invention provides a method, apparatus, and computer implemented instructions for generating gamma corrected antialiased lines. The mechanism of the present invention employs a gamma table or a gamma function, which may be applied to the pixels for the line. The adjustment is actually made to a fragment, which contains all the information used to display a pixel, such as color, intensity, and opacity.

Figure 3:
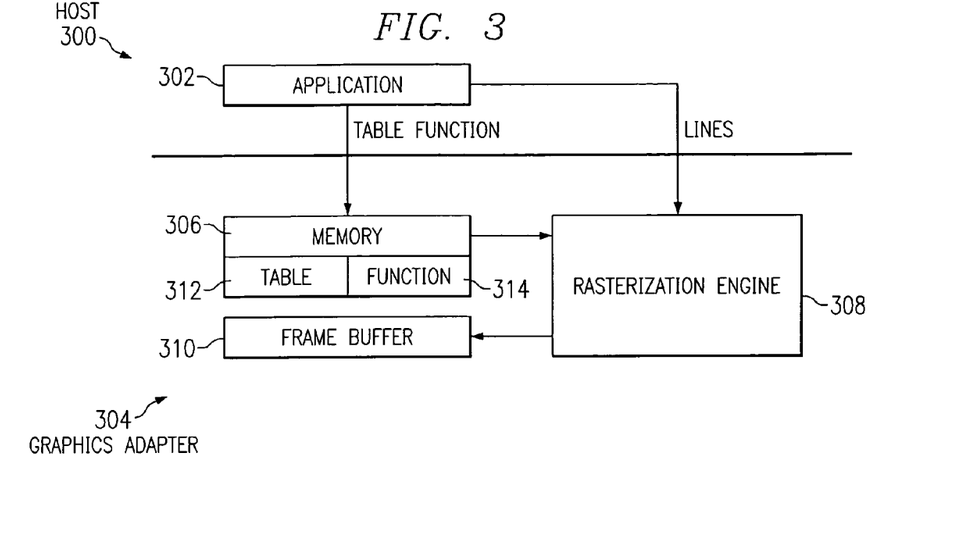
FIG. 3 is a diagram illustrating data flow for displaying graphics in accordance with a preferred embodiment of the present invention.

Turning next to FIG. 3, a diagram illustrating data flow for displaying graphics is depicted in accordance with a preferred embodiment of the present invention.

Host 300 contains application 302. Graphics adapter 304 includes memory 306, rasterization engine 308, and frame buffer 310. Graphics adapter 304 may be implemented in graphics adapter 218 in FIG. 2. Host 300 is implemented as other components within data processing system 200 in FIG. 2, such as processor 202 and main memory 204 in FIG. 2.

Application 302 generates graphics data to be displayed by graphics adapter 304. Application 302 will send lines or other primitive to rasterization engine 308 for display. In these examples, rasterization engine 308 contains the hardware and/or software used by rasterization engine 308 to generate an image for display. Rasterization engine 308 is used to turn text and images into a matrix of pixels to form a bit map for display on a screen. If application 302 sets a gamma table or a gamma function, this table or function will be sent to memory 306 in graphics adapter 304. In this example, memory 306 contains table 312 and function 314, both of which may be used for performing gamma correction on the lines in a pixel by pixel basis. Lines received by rasterization engine 308 for display are processed to generated fragments. A fragment contains information about a pixel, such as color, position, depth information, and opacity.

Rasterization engine 308 will use information from table 312 or function 314 to generate a gamma correction for the pixel represented by the fragment. If table 312 is used, the primitive's pixel coverage value is used as an index into this table. If function 314 is used, then the fragment color is used to fill input variables in the function. For example, the function may take the form of an equation with values for red, green, and blue associated with the pixel being used as input values. The gamma corrected fragment is then sent to frame buffer 310 for display. The mechanism of the present invention avoids the color intensity dampening that occurs with presently available techniques by applying gamma corrections only to the pixels generated for the line by rasterization engine 308.

A variety of different tables may be specified by the application and stored within memory 306 in graphic adapter 304 with each table using a different gamma factor. These tables are generated at an application level, such as by application 302 and sent to graphics adapter 304. Alternatively, a function, such as a gamma correction equation is sent to graphic adapter 304. In this situation, the gamma correction applied to a fragment is calculated by the adapter. These calculations may be performed, for example, by software running on the graphics adapters processor or by hardware containing logic functions.

Figure 4:
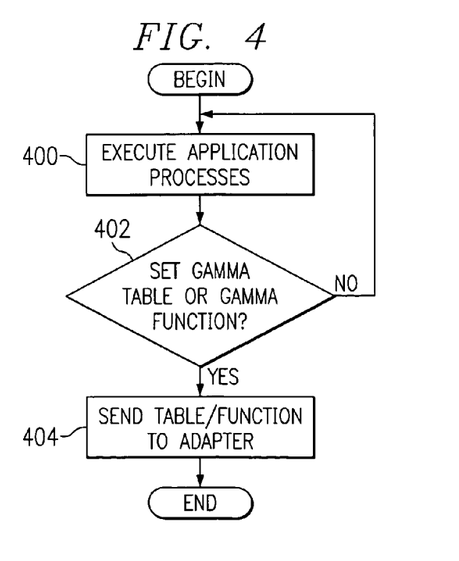
FIG. 4 is a flowchart of a process used for selecting a gamma table or a gamma function in accordance with a preferred embodiment of the present invention.

Turning next to FIG. 4, a flowchart of a process used for selecting a gamma table or a gamma function is depicted in accordance with a preferred embodiment of the present invention. The process illustrated in FIG. 4 may be implemented in application 302 in FIG. 3.

The process begins with the execution of application processes (step 400). These application processes include, for example, receiving user input, generating primitives for display, and performing input/output functions. Next, a determination is made as to whether the processes set a gamma table or a gamma function (step 402). The setting of a gamma table involves generating values for the table. In the depicted examples, the setting of the gamma function comprises selecting or generating an equation for use in obtaining gamma values based on inputs, such as color. If set, the gamma table or gamma function is set, the table or function is sent to the adapter (step 404) with the process terminating thereafter.

With reference again to step 402, if not set, the process returns to step 400 to continue executing application processes.

Figure 5:
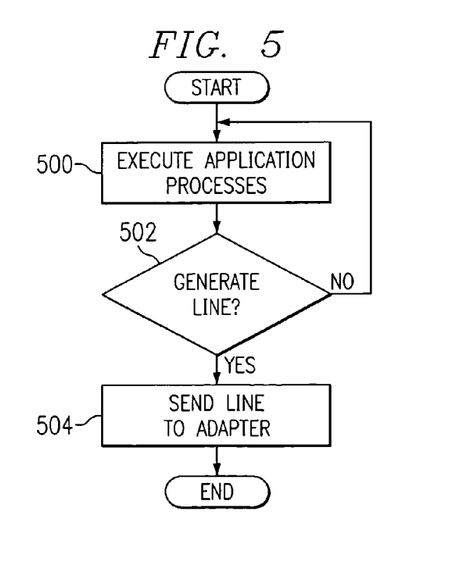
FIG. 5 is a flowchart of a process used for generating graphics data in accordance with a preferred embodiment of the present invention.

Turning next to FIG. 5, a flowchart of a process used for generating graphics data is depicted in accordance with a preferred embodiment of the present invention. The process illustrated in FIG. 5 may be implemented within application 302 in FIG. 3.

The process begins with the execution of application processes (step 500). Next, a determination is made as to whether a line is generated (step 502). If a line is generated, the line is sent to the adapter (step 504) with the process terminating thereafter.

With reference again to step 502, if a line is not generated, the process returns to step 500.

Figure 6:
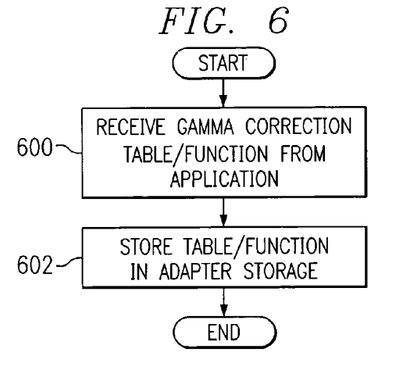
FIG. 6 is a flowchart of a process used for receiving a gamma correction table or a gamma correction function in accordance with a preferred embodiment of the present invention.

Turning next to FIG. 6, a flowchart of a process used for receiving a gamma correction table or a gamma correction function is depicted in accordance with a preferred embodiment of the present invention. The process illustrated in FIG. 6 may be implemented in graphic adapter 304 in FIG. 3.

The process begins by receiving a gamma correction table or a gamma correction function from an application (step 600). Next, the table or function is stored in adapter storage (step 602) with the process terminating thereafter. In the depicted examples, the table or function is stored in memory 306 in FIG. 3.

Figure 7:
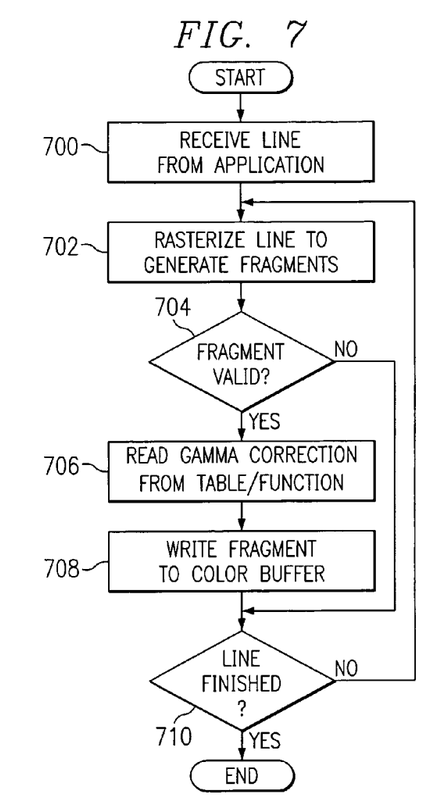
FIG. 7 is a flowchart of a process used for rasterizing a line in accordance with a preferred embodiment of the present invention.

Turning next to FIG. 7, a flowchart of a process used for rasterizing a line is depicted in accordance with a preferred embodiment of the present invention. The process illustrated in FIG. 7 may be implemented in rasterization engine 308 in FIG. 3.

The process begins by receiving a line from an application (step 700). Next, the line is rasterized to generate fragments (step 702). A determination is made as to whether a fragment is valid (step 704). In determining whether the fragment is valid, identifications, such as, for example, as to whether the fragment in within the display window, whether the fragment is hidden by an object, and whether the object is within a stencil boundary are made. If the fragment is valid, a gamma correction is read from the gamma correction table or is generated from the gamma correction function (step 706). The fragment is written to color buffer including the correction to the gamma value for the fragment (step 708). A determination is made as to whether the line is finished (step 710). If the line is finished, the process terminates.

With reference again to step 704, if the fragment is not valid, the process proceeds to step 710. With reference again to step 710, if the line is not finished, the process returns to step 702.

Figure 8:
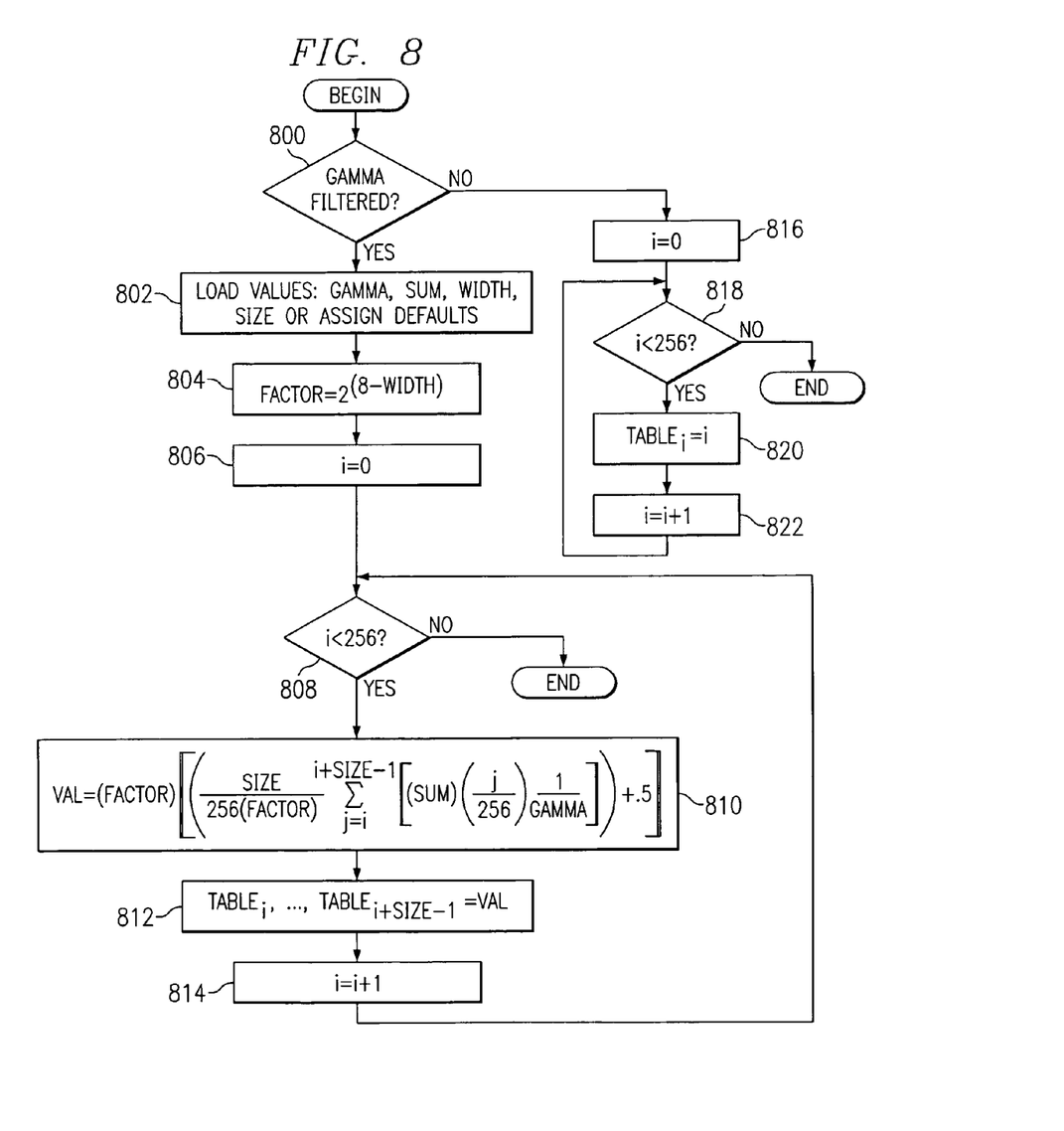
FIG. 8 is a flowchart of a process used for generating a gamma correction table in accordance with a preferred embodiment of the present invention.

Turning next to FIG. 8, a flowchart of a process used for generating a gamma correction table is depicted in accordance with a preferred embodiment of the present invention. The process illustrated in FIG. 8 may be implemented in application 302 in FIG. 3.

The process begins by determining whether the entries in the table are to be gamma filtered (step 800). If the entries are to be gamma filtered, values for gamma, sum, width, and size are loaded or assigned default values (step 802). Then, the variable factor is set equal $2^{(8-width)}$ (step 804). The index i equal to 0 (step 806).

Then, a determination is made as to whether i is less than 256 (step 808). If i is not less than 256, the process terminates. Otherwise, the value for Val is set as follows:

$$Val = (factor)\left[\left(\frac{size}{256(factor)}\sum_{j=i}^{i+size-1}\left[(sum)\left(\frac{j}{256}\right)\frac{1}{gamma}\right]\right)+.5\right]$$

Where: Factor is an adjustment to the maximum value represent able by each table element, Sum=maximum intensity value that can be represented, may be less than maximum element value, but not more, Size is a number of entries in table where 256 is the maximum, and Width is a number of bits allocated per entry where 8 is the maximum (step 810). Then table entries i through i+size−1 are set equal to the variable Val (step 812). The index i is then incremented by 1 (step 814) with the process then returning to step 808 as described above.

With reference again to step 800, if the entries are not to be gamma filtered, an index i is set equal to 0 (step 816). Then, a determination is made as to whether i is less than 256 (step 818). If i is not less than 256, the process terminates. Otherwise, table entry i is set equal to i (step 820). Next, the index i is incremented by 1 (step 822) with the process then returning to step 818 as described above.

Figure 9:
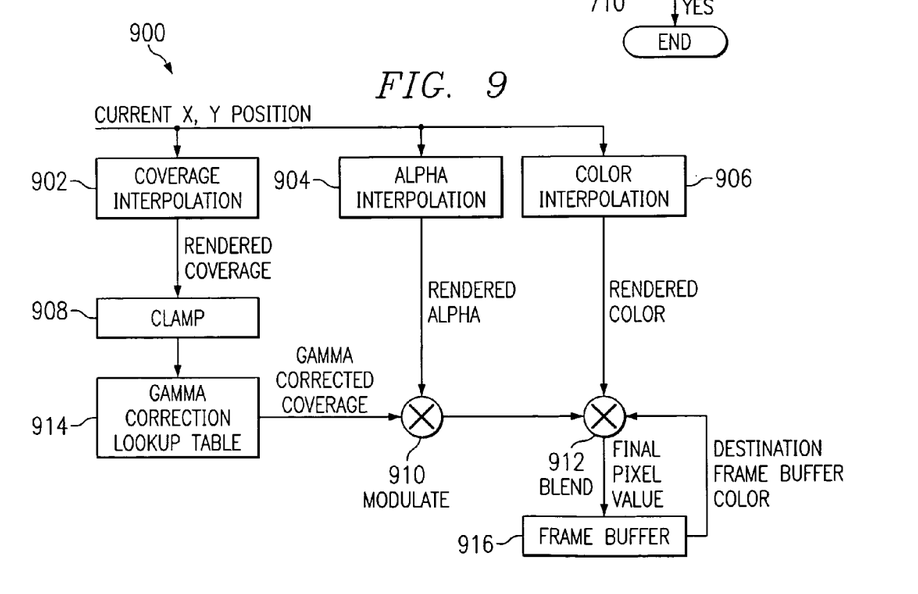
FIG. 9 is a block diagram illustrating a gamma correction mechanism in accordance with a preferred embodiment of the present invention.

Turning next to FIG. 9, a block diagram illustrating a gamma correction mechanism is depicted in accordance with a preferred embodiment of the present invention. The mechanism illustrated in FIG. 9 may be implemented in hardware within graphics adapter 304 in FIG. 3.

Gamma correction unit 900 includes coverage interpolation unit 902, alpha interpolation unit 904, color interpolation 906, clamp 908, modulate function 910, blend function 912, gamma correction lookup table 914, and frame buffer 916. In these examples, coverage interpolation unit 902, alpha interpolation unit 904, color interpolation 906, clamp 908, modulate function 910, and blend function 912 may be located within rasterization engine 308 in FIG. 3. Gamma correction lookup table 914 may be located within memory 306 in FIG. 3. Frame buffer 916 is implemented as frame buffer 310 in FIG. 3.

Coverage interpolation unit 902 identifies how much of a pixel is covered by a line. The pixel may be partially covered, entirely covered, or not covered at all by a line. Alpha interpolation unit 904 identifies a degree of transparency for the pixel. Color interpolation unit 906 interpolates or generates a red, green, and blue (RGB) value for the pixel. Clamp 908 prevents coverage values generated by coverage interpolation unit 902 from going out of a selected range of values.

The alpha value generated by alpha interpolation unit 904 is input into modulate function 910 along with a corrected gamma value from gamma correction lookup table 914. Modulate function 910 functions to adjust the gamma correction factor by the opacity factor specified as the alpha component of the fragment. Blend unit 912 receives a frame buffer color from frame buffer 916, a color value from color interpretation unit 906, and a value from modulate function 910 to generate a final pixel value. This final pixel value is also referred to as a final fragment value. Blend unit 912 takes the values from modulate function 910 and color interpolation unit 912 and blends these values with the color value presently located in frame buffer 916. This color value is the color value for the particular fragment.

Figure 11:
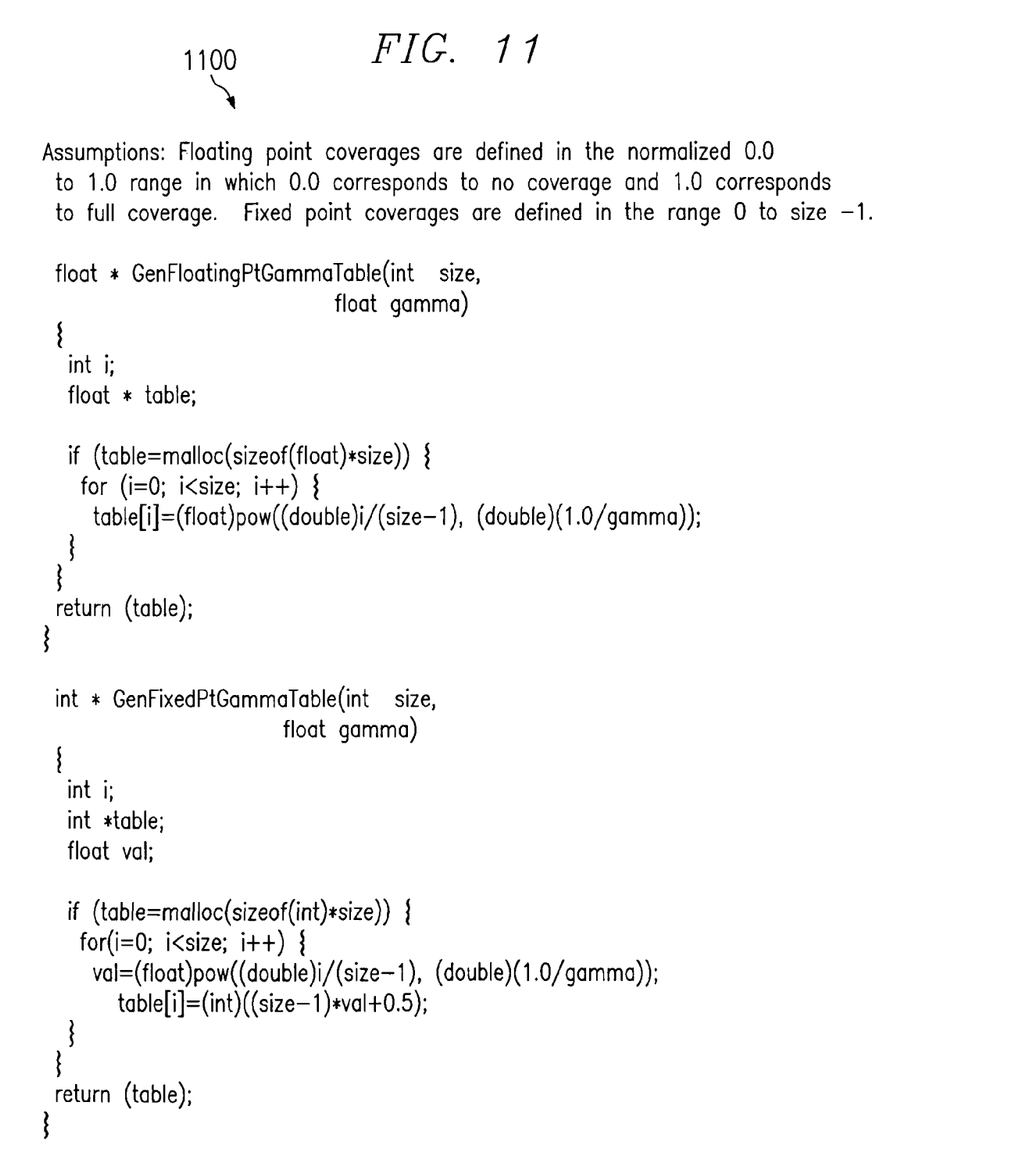
FIG. 11 is code illustrating a more generalized version of the process illustrated in FIGS. 10A-10B.

Turning next to FIGS. 10A-10B, code illustrating a process for generating a gamma correction table are depicted in accordance with a preferred embodiment of the present invention. Code 1000 is an example of code embodying the process illustrated in FIG. 8. Code 1000 is written in C language in these examples. A generalization of this algorithm that removes the assumptions regarding size of coverage values, number of table entries and power-of-2 limitations can be seen in code 1100 in FIG. 11.

Thus, the present invention provides an improved method, apparatus, and computer implemented instructions for generating gamma corrected antialiased lines. The mechanism of the present invention avoids the color intensity dampening that occurs with presently available techniques by applying gamma corrections only to the pixels generated for the line by the rasterization engine. Further, since the bulk of computational intensity is associated with the generation of pixel locations, the adjustment of pixel color intensity does not impact the overall rendering performance of a graphic adapter.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for antialiasing lines for display, the method comprising:
   receiving, at one or more processors, graphics data for display wherein the graphics data includes primitives defining lines;
   applying, using the one or more processors, a gamma correction to the graphics data on a per primitive basis to form the antialiased lines, wherein the gamma correction is applied only to the primitives defining lines; and
   displaying the antialiased lines on a display.

2. The method of claim 1, wherein the gamma correction is performed using a gamma correction table.

3. The method of claim 1, wherein the gamma correction is performed using a gamma correction function.

4. The method of claim 2, wherein the gamma correction table is specified by an application and loaded into a graphics subsystem processing the graphics data for display within the data processing system.

5. The method of claim 3, wherein the gamma correction function is specified by an application and loaded into a graphics subsystem processing the graphics data for display within the data processing system.

6. The method of claim 1, wherein the applying step comprises:
   adjusting intensity of pixels defining the primitives.

7. A data processing system comprising:
   a bus system;
   a communications unit connected to the bus, wherein data is sent and received using the communications unit;
   a memory connected to the bus system, wherein a set of instructions and data including a gamma correction table are located in the memory; and
   a processor unit connected to the bus system, wherein the processor unit executes the set of instructions to receive graphics data for display, wherein the graphics data includes primitives defining lines; apply a gamma correction to the graphics data on a per primitive basis to form antialiased lines, wherein the gamma correction is applied only to the primitives defining lines; and display the antialiased lines.

8. The data processing system of claim 7, wherein the bus system includes a primary bus and a secondary bus.

9. The data processing system of claim 7, wherein the processor unit includes a single processor.

10. The data processing system of claim 7, wherein the processor unit includes a plurality of processors.

11. The data processing system claim 7, wherein the communications unit is an Ethernet adapter.

12. The data processing system of claim 7, wherein the processor unit and memory is located in a graphics adapter.

13. A data processing system for antialiasing lines for display, the data processing system comprising:
   a processor;
   receiving means for receiving graphics data for display, wherein the graphics data includes primitives defining lines;
   applying means for applying a gamma correction to the graphics data on a per primitive basis to form the antialiased lines, wherein the gamma correction is applied only to the primitives defining lines; and
   displaying means for displaying the antialiased lines.

14. The data processing system of claim 13, wherein the gamma correction is performed using a gamma correction table.

15. The data processing system of claim 13, wherein the gamma correction is performed using a gamma correction function.

16. The data processing system of claim 14, wherein the gamma correction table is specified by an application and loaded into a graphics subsystem processing the graphics data for display within the data processing system.

17. The data processing system of claim 15, wherein the gamma correction function is specified by an application and loaded into a graphics subsystem processing the graphics data for display within the data processing system.

18. The data processing system of claim 13, wherein the applying means comprises:
   means for adjusting intensity of pixel defining the primitives.

19. A non-transitory medium storing a computer program product for antialiasing lines for display, the computer program product comprising:
   first instructions for receiving graphics data for display, wherein the graphics data includes primitives defining lines;
   second instructions for applying a gamma correction to the graphics data on a per primitive basis to form the antialiased lines, wherein the gamma correction is applied only to the primitives defining lines; and
   third instructions for displaying the antialiased lines.

20. An apparatus comprising:
   an input, wherein position information for a pixel is received at the input;
   a coverage interpolation unit connected to the input, wherein the coverage interpolation unit generates a coverage valued at a first output in which the coverage value identifies how much of the pixel is covered at a first output;
   an alpha interpolation unit connected to the input, wherein the alpha interpolation unit identifies a degree of transparency for the pixel as an opacity value at a second output;
   a color interpolation unit connected to the input, wherein the color interpolation unit generates a red, green, and blue value for the pixel at a third output;
   a gamma correction unit connected to the first output, wherein the gamma correction unit generates a gamma corrected value for the pixel using the coverage value at a fourth output, wherein the gamma correction unit only generates a gamma corrected value for pixels that are part of a line;
   a modulate unit, wherein the modulate unit is connected to the second output and the fourth output, wherein the modulate unit adjusts the gamma corrected value to the opacity value to generate an adjusted gamma corrected value at a fifth output;
   a frame buffer having a sixth output, wherein the frame buffer holds a final pixel value; and
   a blend unit connected to the fifth output and the third output, wherein the blend unit blends the adjusted gamma corrected value and the red, green, and blue value for the pixel with a current pixel value from the sixth output of the frame buffer to form the final pixel value for display.

21. The apparatus of claim 20, wherein the gamma correction unit is connected to the first output of coverage interpolation unit by a clamp, wherein the clamp prevents values generated by the coverage interpolation unit from going out of a selected range of values.

22. A method in a data processing system for antialiasing lines for display, the method comprising:
   generating, by one or more processors, graphics data for display;
   determining, by the one or more processors, whether the graphics data comprises a line;
   if the graphics data comprises a line, sending the graphics data to an adapter using the one or more processors;
   applying, by the one or more processors, a gamma correction to the graphics data to form an antialiased line, wherein the gamma correction is applied only if the line is a primitive defining line.

23. The method of claim 22, wherein gamma correction is applied only to pixels generated for the line by a rasterization engine.

* * * * *